(12) United States Patent
Shehorn (10) Patent No.: US 8,146,585 B2
(45) Date of Patent: Apr. 3, 2012

(54) PASSIVE SOLAR PORTABLE HEATER

(75) Inventor: Josh Shehorn, Gardnerville, NV (US)

(73) Assignee: Solar Design Group, LLC, Gardnerville, NV (US)

( * ) Notice: Subject to any disclaimer, the term of this patent is extended or adjusted under 35 U.S.C. 154(b) by 290 days.

(21) Appl. No.: 12/368,460

(22) Filed: Feb. 10, 2009

(65) Prior Publication Data

US 2010/0199981 A1 Aug. 12, 2010

(51) Int. Cl.
*F24J 2/50* (2006.01)
*F24J 2/02* (2006.01)

(52) U.S. Cl. ......... 126/706; 126/708; 126/681; 126/704

(58) Field of Classification Search .......... 126/617, 126/400, 708, 706, 681, 704
See application file for complete search history.

(56) References Cited

U.S. PATENT DOCUMENTS

| | | | |
|---|---|---|---|
| 3,391,688 A | 7/1968 | Dery | |
| 4,077,391 A | 3/1978 | Way, Jr. | |
| 4,125,109 A | 11/1978 | Erwin | |
| 4,220,141 A | 9/1980 | Way, Jr. | |
| 259,694 A | 6/1981 | Halacy, Jr. | |
| 4,284,071 A | 8/1981 | Steinberg | |
| 4,292,957 A | 10/1981 | Golder | |
| 4,378,790 A | 4/1983 | Erwin | |
| 4,446,854 A | 5/1984 | Clevett et al. | |
| 4,462,390 A * | 7/1984 | Holdridge et al. | 126/587 |
| 4,696,285 A | 9/1987 | Zwach | |
| 4,848,320 A | 7/1989 | Burns et al. | |
| 4,850,339 A | 7/1989 | Ghatak | |
| 5,139,010 A | 8/1992 | Borgens, Jr. et al. | |
| 5,156,894 A * | 10/1992 | Hood et al. | 428/34 |
| 5,356,705 A * | 10/1994 | Kelch et al. | 428/332 |
| 5,617,843 A | 4/1997 | Erwin | |
| 5,893,360 A | 4/1999 | Stoumen et al. | |
| 5,937,792 A * | 8/1999 | Madrid | 119/482 |
| 2006/0000501 A1 | 1/2006 | Ghausi | |
| 2009/0293862 A1* | 12/2009 | Bailey | 126/617 |

FOREIGN PATENT DOCUMENTS

IN 200801294 * 9/2008

OTHER PUBLICATIONS

"Optimisation factor of solar ovens", Solar Energy, vol. 31, Issue 2, 1983, pp. 235-237, Kulbir Singh Malhotra, N.M. Nahar, B.V. Ramana Rao.*

(Continued)

*Primary Examiner* — Kenneth Rinehart
*Assistant Examiner* — William Corboy
(74) *Attorney, Agent, or Firm* — SilverSky Group, LLC (57) ABSTRACT

A passive solar heating unit is disclosed, including a portable heater version of the invention that includes an insulated shell structure, an inclined, vertically shaped window formed within the structure, an insulated door to the structure, a handle, and two operating positions, one for summer and one for winter. The heating unit has a dark exterior to absorb heat and a reflective interior to trap sunlight entering through the window. When used to generate heat sufficient to heat food and other items, the ratio of the interior volume of the unit to the size of the sunlight window is approximately 16:1. Other configurations, for providing heat in other applications, utilize different volume to window size ratios and different shaped windows.

30 Claims, 6 Drawing Sheets

OTHER PUBLICATIONS

"Awesome solar powered lunch box" (internet website), http://www.instructables.com/id/Solar-Powered-food-warmer/ ; applicant has no knowledge of original posting date; available as of at least Nov. 13, 2008.

"Solar box cookers for schools" (internet website), http://www.journeytoforever.org/edu_sc.html ; applicant has no knowledge of original posting date; available as of at least Nov. 13, 2008.

"Solar Cookers International (How Solar Cookers Work)" (internet website), http://www.solarcookers.org/basics/how.html ; applicant has no knowledge of original posting date; available as of at least Oct. 2, 2008.

Solarcooking.wikia.com (internet website), http://solarcooking.wikia.com/wiki/Box_cookers, applicant has no knowledge of original posting date, original posting date as listed on the website Jan. 24, 2007.

* cited by examiner

PASSIVE SOLAR PORTABLE HEATER

BRIEF DESCRIPTION OF THE INVENTION

The present invention is directed to a passive solar heating unit. A portable heater version of the invention includes an insulated shell structure, an inclined, vertically shaped window formed within the structure, an insulated door to the structure, a handle, and two operating positions, one for summer and one for winter. The heating unit has a dark exterior to absorb heat and a reflective interior to trap sunlight entering through the window. When used to generate heat sufficient to heat food and other items, the ratio of the interior volume of the unit to the size of the sunlight window is approximately 16:1. Other configurations, for providing heat in other applications, utilize different volume to window ratios and different shaped windows.

CROSS-REFERENCES TO RELATED APPLICATIONS

Not Applicable.

STATEMENT AS TO THE RIGHTS TO INVENTIONS MADE UNDER FEDERALLY SPONSORED RESEARCH OR DEVELOPMENT

Not Applicable.

REFERENCE TO A "SEQUENCE LISTING," A TABLE, OR A COMPUTER PROGRAM LISTING APPENDIX SUBMITTED ON A COMPACT DISK

Not Applicable.

BACKGROUND OF THE INVENTION

Box-type solar ovens have been in existence since at least the 18$^{th}$ century. A comprehensive compendium of different box cookers from around the world was provided at http://solarcooking.wikia.com/wiki/Box_cookers (a printed copy of this website entitled "Box cookers—Solar Cooking," dated 4 Feb. 2009, was included in the Information Disclosure Statement filed with the present application). The earliest designs were comprised of an insulated box with one or two glass panes forming a horizontal cover and window to the oven. When more than one glass pane is used for the window, an air gap is usually created between the two panes to form an insulation barrier. An example of this type of oven is illustrated in U.S. Pat. No. 3,391,688. Another variation involves inclining the upper of the two panes by some angle to position that pane relative to the position of the sun in the sky. An example of this type of oven, where the movable upper pane is attached to the lower box by a telescoping strip assembly, is illustrated in U.S. Pat. No. 4,220,141. In general, the size of the window to the box oven is sized as large as possible based on the adage that more sun light entering the box equals more heat within the box.

Many additional variations to box ovens have been developed over the years, including the addition of knobs or handles for the lid window, handles for the insulated base, and the development of dome shaped window lids (like the glass top of a cooking pot). The interior of such box ovens was typically the natural color of the material used to make it, such as tin, sheet metal and aluminum. The interior surface was often painted black to absorb heat, although the paint was often removed after multiple cleanings. If the interior is made of sheet glass, the glass can be painted black on the reverse side (which does not touch the food). The exterior surface of the box was usually its natural color and not painted, or no significance was attributed to the exterior color.

Since World War II, box ovens have been improved by the addition of a great variety of different exterior reflectors. U.S. Pat. Nos. 4,077,391, 4,125,109, 4,284,071, 4,292,957, 4,378,790 and 4,446,854, illustrate a base oven with one or more externally propagating reflector panes for directing sun light toward the base oven. U.S. Pat. No. 4,848,320 illustrates that the base may be turned at an angle toward the angle of the sun. U.S. Pat. Nos. 4,850,339 and 5,139,010 illustrate box ovens with lids than can be tilted to act as reflectors. U.S. Pat. No. 5,617,842 illustrates a base with a number of flower-petal shaped reflectors placed on a stand that can be oriented relative to the sun. Many of these box ovens are designed to generate enough heat at a cooking surface to boil water and fully cook foods, including meat, vegetable and grain meals, and are not portable, or easily portable. U.S. Pat. No. D259,694 does illustrate a more portable box oven with externally projecting reflectors.

In more recent years, solar ovens have largely moved away from the more traditional box design, such as toward parabolic cookers, such as that illustrated in U.S. Pat. No. 4,696,285, which includes a complicated frame assembly for adjusting for azimuth, declination and latitude to accurately track the position of the sun in the sky. A more untraditional design is illustrated by U.S. Pat. No. 5,893,360, which describes a large inflatable transparent bubble within which a food holding body can be placed when the bubble is inflated. United States Publication Number US2006/00501 illustrates one of the latest advancements in box oven design, where the box oven is electrically connected to an externally positioned solar panel.

DETAILED DESCRIPTION OF THE INVENTION

Figure 1:
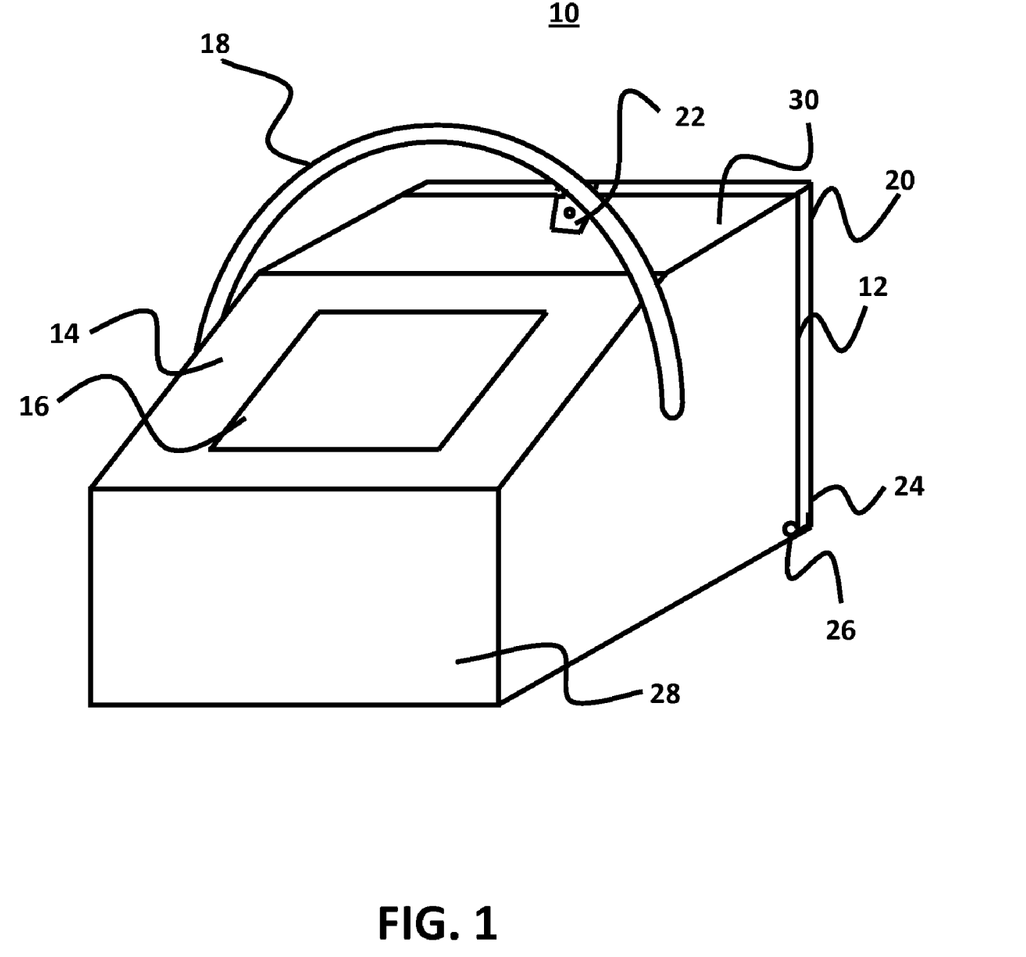
FIG. 1 is a perspective view of a portable solar heater in its summer operating position in accordance with the present invention.

The present invention is directed to a passive solar heater that can be used to portably store, carry and heat food and other items, and which can also be used for other applications, such as a heated house for a pet or a heated tent for human use. The portable heater 10, as illustrated in FIG. 1 is comprised of an insulated shell 12 having seven panels, including an inclined panel 14 with a window 16. The exterior surface of the shell 12 is formed of a plastic, metal or similarly rigid material that is darkly colored, preferably black so that it will absorb as much heat from sun light as possible. The interior surface of the shell 12 is also formed of a plastic, metal or similar material, but is lightly colored and is preferably highly reflective so sun light entering the shell 12 will be reflected around the inside of the heater 10 and trapped (as further described below), so as to heat the interior of the shell 12 and any item it may contain. As referred to herein, a panel is a face of the heater 10, which is comprised of both the interior and exterior surfaces of the shell 12, any insulation that may be in between, and any other unique aspects of that face, such as the inclusion of a window in the case of the inclined panel described below, or the latch and hinges associated with the door pane, also as described below.

Attached to two side panels of the shell 12 is a handle 18. The handle could be molded into the side panels of the shell or attached through numerous different attachments, such as a clip structure where the female clip is molded into the side panel and the male clip is molded into the handle. The female clip is formed to have a narrower outer opening and larger interior area so that the male clip is compressed as it is inserted into the female clip and then expands when it enters the larger interior area, thereby preventing the male clip from being removed from the female clip.

The handle 18 could be rigid or flexible. A flexible plastic handle 18 could be used when the shell 12 is formed of plastic, while a rigid metal handle 18 could be used when the shell 12 is formed of metal, such as stainless steel. Alternatively, the handle 18 could be formed of a variety of materials, such as plastic core with a stainless steel exterior.

A hatch or door panel 20 is located at the back of the heater 10 as illustrated in FIG. 1 and held in place against the main component of the heater 10 by a latch 22. The latch 22 is preferably a compression type latch that will force the door 20 to form a very tight seal with the main component of the heater 10. The door panel 20 would be hinged near the bottom panel 24 of the heater 10 so that the door panel 20 could swing away from the main component of the heater 10 and lay flat on the surface upon which the heater was sitting. The hinge 26 could be formed with one piece in the shell 12 of the main component, a second piece in the door panel 20, and a pin joining the two pieces together. Likewise bearing hinges or strap hinges could be used, depending on the amount of expense the manufacturer of the heater wants to dedicate to the hinge function. It is important that the hinge 26 help to form a tight seal between the door panel 20 and the main component of the heater 10 so no heat generated within the heater is lost through the seal formed by the door panel 20 with the main component of the heater 10.

The window 16 is formed within an inclined panel and is made of a transparent or translucent material, such as glass, polycarbonate, polymethyl methacrylate (commonly called acrylic glass), etc., with an R-value (thermal insulation or resistance) of 1 or greater. The non-window portion of the inclined panel would be formed of the same materials as the other panels, and have similar insulation, only it would be designed to also hold the window, which would likely have a low insulation level (the R-value). In order to achieve a higher R-value, thicker glass could be utilized or multiple layers of thinner glass could be used. A double pane glass window has an R-value of 2, a triple panel has an R-value of 3, etc.

The R-value is a measure of the thermal resistance of an insulating material. Increasing the thickness of an insulating material increases the R-value. More specifically, the R-value is a measure of an insulating material's heat lost retardation under specified test conditions. The primary mode of heat transfer impeded by an insulating material is convection, but also involves conduction and radiation. R-values are determined by $$R = 1/U$$

where U is the U-factor (or U-value), the overall heat transfer coefficient, which describes how well an insulation material conducts heat. The U-factor measures the rate of heat transfer through the insulation material over a given area, under standardized conditions. The usual standard is a temperature gradient of 24° C., at 50% humidity, with no wind. The U-factor is measured in units of watts/m$^2$-K, using the International System of Units (SI), so the R-value is measured in Kelvin, square meters per watt, or K-m$^2$/W. In the United States, the R-value is measured in degrees Fahrenheit, square feet hours per Btu (ft$^2$-° F.-h/Btu). 1 K-m2/W is approximately equal to 5.67446 ft$^2$-° F.-h/Btu.

The area of the window 16 in square inches is proportional to the interior volume of the shell 12 of the heater 10 in cubic inches, and the ratio between the two is application specific. In order to achieve a maximum heating capacity within the heater 10, which is necessary for heating food and certain other smaller items, the ratio between the volume and the window area is preferably 16:1, although ratios as low as 20:1 and as high as 5:1 would be acceptable. The ratio of 16:1 has been found to yield the greatest heating capacity for the present invention, when used to heat food and other items, but higher and lower ratios enables the present invention to be adapted to other climates, latitudes and dimensional footprints. The present invention can be implemented in other applications, other than heating food, such as heating a pet house or heating a tent in which humans are staying.

A smaller ratio between the interior volume of the shell 12 and the area of the window 16 will generate less heat within the heater, thereby making it safer and more appropriate for other uses. A bigger window relative to the interior volume will reduce the overall insulation of the heater by reducing the amount of insulated shell (as further discussed below) and cut down on internal reflection, thereby generating less heat and retaining less heat. A smaller window relative to the interior volume will let in too little sunlight to generate sufficient heat within the heater 10 to provide adequate heat in some instances. For example, the Food and Drug Administration recommends that food heating ovens heat food to a temperature of 140 degrees, so the portable heater needs to be able to generate at least that level of internal heat, if not more. At the same time, a pet house that generated an internal temperature of 140 degrees would be deadly, so the ratio needs to be lower for that application. As will be further explained below with reference to FIGS. 5 and 6, a pet house preferably has a ratio of 6:1, while a human tent has a ratio of 12:1, although other ratios are possible.

In the preferred embodiment of the present invention, when the portable heater 10 is positioned in its summer operating position, the dimensions of the shell 12 and the window 16 are as follows:

The length of the bottom panel 24, including the width of the door panel 20, is 13 inches, and the width is 14.5 inches;

The height of the door panel 20 is 12 inches;

The height of the front face panel 28 is 7 inches;

The width of the inclined face panel 14 is 8.5 inches;

The top panel 30, including the width of the door panel 20, is 6 inches; and

The window 16 is 5 inches high by 10 inches wide.

After accounting for a portion of the internal volume created by the shell 12 and door panel 20 being filled with insulation for the heater, the above dimensions yield an interior volume of the heater 10 of +/−800 cubic inches, while the area of the glass window 16 is +/−50 square inches, thereby creating a 16:1 ratio.

In addition to the ratio of internal volume to window area being important, the top panel (either front face panel 28 or top panel 30), the face panel in which the window 16 is placed, and the angle at which the window 16 is positioned are also important, and these positions change depending on the time of year and location of the user. As illustrated in FIG. 1, the heater 10 is positioned in its summer operating position, so that the door panel 20 opens at the rear of the main component of the heater 10, the top panel 30 forms the top of the heater 10, and the window 16 is positioned at an angle of +/−25 degrees relative to the surface upon which the heater 10 is sitting. In the summer, when the sun is generally higher in the sky during the middle portion of each day, the angle of 25 degrees has been found to be ideal for generating the greatest heat within the heater 10 for people living within the largest population centers in the northern and southern hemispheres. Closer to the equator, the angle of the window 16 could be reduced to 5 degrees relative to the surface.

Placing the window 16 on a sloping or inclined face panel (versus on a horizontal upper surface) is important because the angle of the window 16 prevents solar energy entering the heater 10 from easily reflecting back out of the heater 10. This design also enables the top panel of the heater 10 (top panel 30 in the summer and front face panel 28 in the winter) to improve the thermal insulating aspects of the heater. If the window was also the top of the heater 10, as is the case in most prior art box-style heaters, much of the solar energy entering the heater would be reflected back out, and the window, which has a low R-value, would do little to retain the heat rising within the heater to its top. By angling the window and utilizing a top with a significantly higher R-value, the present invention is able to reduce solar energy reflection and retain more heat rising within the heater 10 to the top, whether that is top panel 30 or front face panel 28, as noted below.

Figure 2:
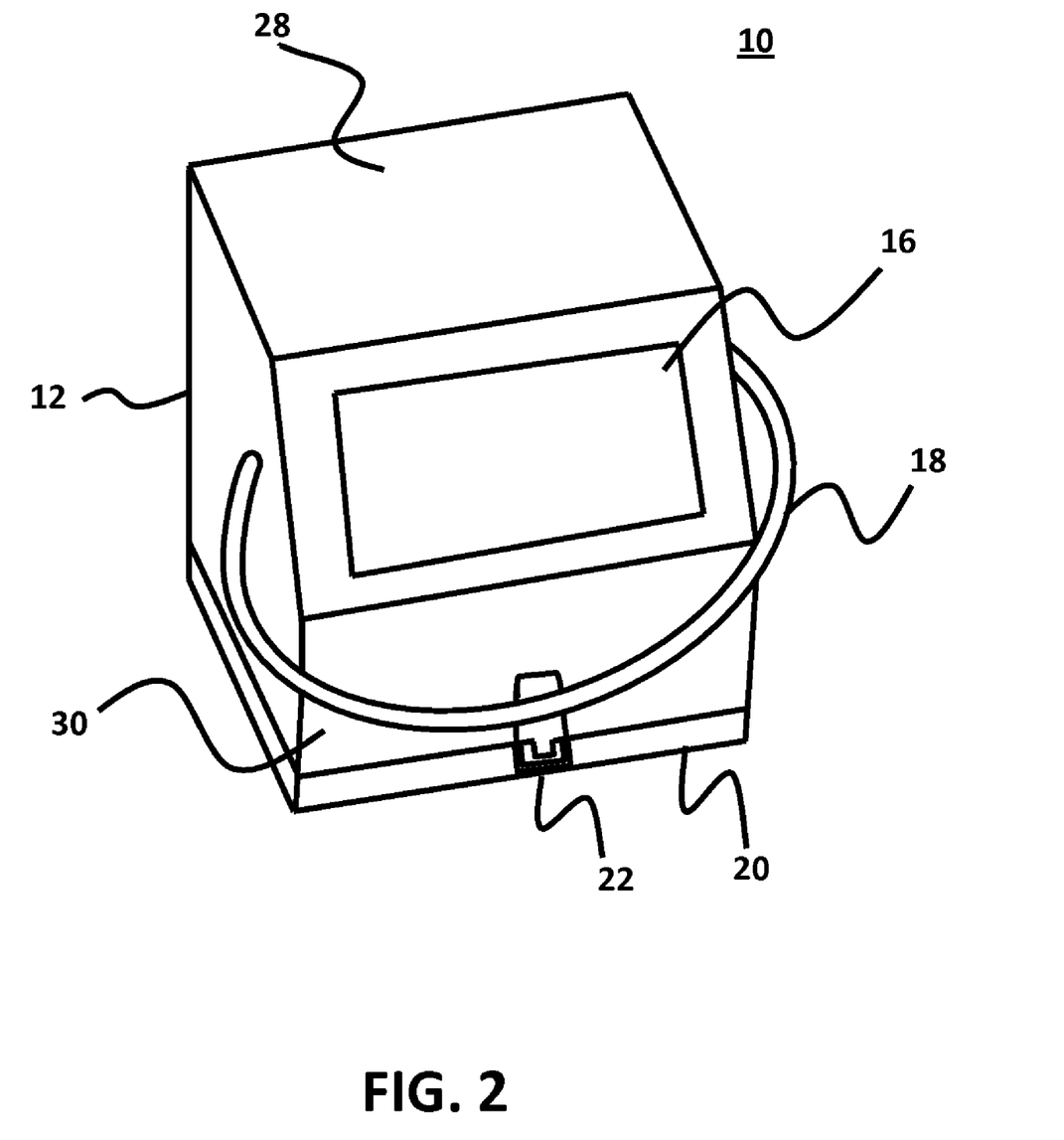
FIG. 2 is a perspective view of the solar heater of FIG. 1 in its winter operating position.

As illustrated in FIG. 2, the heater 10 is positioned in its winter operating position, so that the heater 10 is now sitting on its door panel 20, which now becomes the bottom of the shell 12, and the front face panel 28 is now the top of the shell 12. Likewise, what was the top panel 30, now becomes a side, and what was the bottom panel now becomes a side. To open the unit, the door panel 20 would be unlatched by the latch 22, the door would be held down on the ground surface, and the main component would be tilted away until its side (formerly its bottom) was sitting on the ground surface. When the heater 10 is positioned in its winter operating position, the angle of the window 16 to the ground is approximately 65 degrees, which is an ideal angle for maximizing sunlight during the winter away from the equator, when the sun is lower in the sky during the middle portion of each day, while still preventing solar energy entering the heater from easily escaping.

A further unique characteristic of the heater 10 of the present invention is that it is designed for both optimal summer and winter use without requiring any alteration or modification by a user. A user could open the door panel 20 in either operating mode, place an item to be heated inside (in the summer it would be placed on the bottom surface of the interior and in the winter it would be placed on the interior surface of the door), close the unit and position the window 16 so that it faces the most sunlight. The portable nature of the heater 10 also enables it to operate as a storage unit for items that may be heated later. For example, a user could place a food item in the heater 10 in the morning, such as a covered bowl of soup, or a burrito, and carry that food item to a job site inside the heater 10. To prevent the food item from being prematurely heated, the heater 10 could be turned so that sun light could not easily shine through the window 16. Depending on the season, the user would turn the window 16 toward the sun sometime prior to wanting to eat the food item to be heated. In the summer, this time period might be thirty minutes and in the winter, this time period might be an hour. Once the heater 10 has had sufficient time to collect sun light and retain that heat energy, the food item would be sufficiently heated to be consumed. Other items could also be heated and/or dehydrated in a similar fashion, such as wet items of clothing, a frozen piece of equipment, etc.

The vertical shape of the window 16 is also important in that it helps to control the efficiency of the heater 10, especially when it is used to heat other items for other purposes, such as heating a pet within a pet house or a human (and their gear and clothing) within a tent, as further described below. When the heater 10 is used to heat food and other items that can get very hot, a wider vertical shape to the glass will maximize solar energy collection, reduce reflection out of the heater, and retain as much heat as possible. When used in other designs, this same vertical shape may create too much heat, so the shape is altered to reduce efficiency, such as by making the glass taller. In the event greater efficiency is needed, however such as on a really cold day, the house or tent can be turned on its side to increase efficiency. Hence the overall design of the present invention maximizes the flexibility of the heater. These various features (such as the interior volume to window area ratio, the shape of the window, the angle of the window during the time of year, and other features to be further described below), of the heater unit work together to collect as much passive heat energy from the sun as possible given the time of the year, while preventing reflection and retaining as much of that heat as possible within the heater 10.

As a result of its design, with the portable heater 10, the item to be heated can reach temperatures as high as 200 degrees within as little as an hour. This temperature is sufficient to heat coffee, soup and other liquids to a temperature that will feel hot to a user. Sandwiches, burritos and similar types of lunch items could be safely heated for consumption. Even a frozen item, such as a burrito can be defrosted and heated to a safe temperature for consumption within a relatively short period of time. As noted, the heater 10 can also be used to heat non-food items, such as frozen mechanical or electrical parts, gloves, hats and other gear, etc. Although a seal is formed between the door 20 and the main component of the heater 10, sufficient moisture can leak through the seal to enable a user to dry or dehydrate items as well, such as a wet pair of gloves. When the heater 10 is not being used to heat items, it can also be used to store items, such as phone, keys, a wallet, etc.

Figure 3:
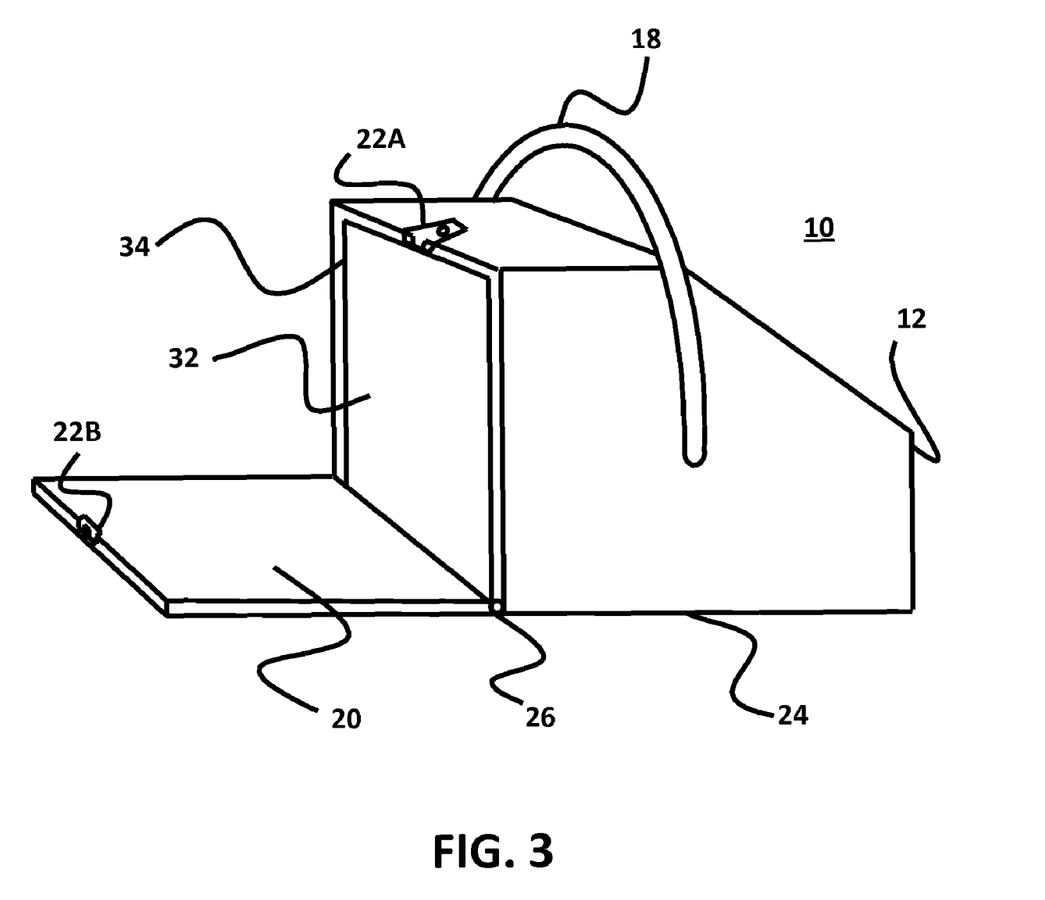
FIG. 3 is a side view of the solar heater of FIG. 1 illustrating its door in the closed and open positions.
Figure 4:
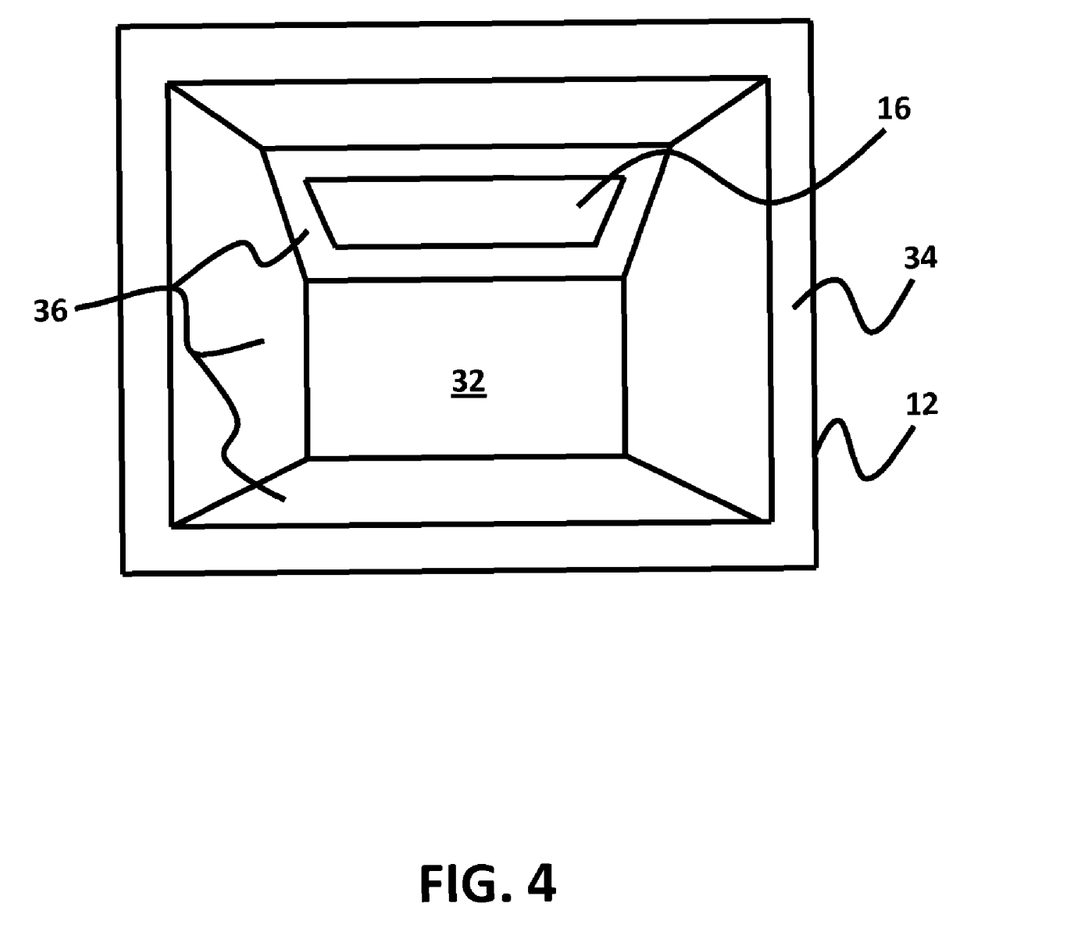
FIG. 4 is a rear, perspective view of the solar heater of FIG. 1 when the door is removed.

FIG. 3 shows a perspective view of the side and rear of the heater 10 with the door panel 20 fully open. This illustrates that the volume of the interior area 32 of the heater 10 is reduced by the thickness of the insulated area 34 of the shell 12. The interior area 32 is further illustrated in FIG. 4, which shows the interior area 32 of the heater 10 without the door panel 20 in place. The surfaces 36 of the interior area 32 and the internal side of the door panel 20 are made of a highly reflective material so as to cause as much light entering through the window 16 to be reflected within the interior area 32, which serves to trap more of the sun's heat energy within the heater 10. The surfaces of the interior area 32 could be made of a white plastic, stainless steel or some other metal. Preferably, these surfaces are mirror finished or even parabolic finished thereby enhancing reflectivity and directing heat energy toward the central portion of the interior area 32 where the item to be heated is located.

As illustrated in FIG. 3, the insulated area 34 is between one to two inches thick and is filled (between the shell 12 and the surface of the interior area 32) with an insulating material, such as a blown insulation material or a foam insulation, that results in the insulated body of the heater having an R-value of at least 5, with higher R-values being highly desired. If more efficient insulating materials are used, then the thickness of the insulated area 34 could be reduced, thereby possibly reducing the size of the shell 12 without decreasing interior volume. The door panel 20 would be similarly insulated, and when the door is shut and latched with latch 22, a tight seal would be formed between the door panel 20 and the shell 12, so as to prevent heat escape. As shown in FIG. 3, the compression latch 22 is comprised of two parts, the latch handle mechanism 22A and the latch point 22B that works in cooperation with the mechanism 22A to pull the door panel 20 tightly against the shell 12.

Figure 5A:
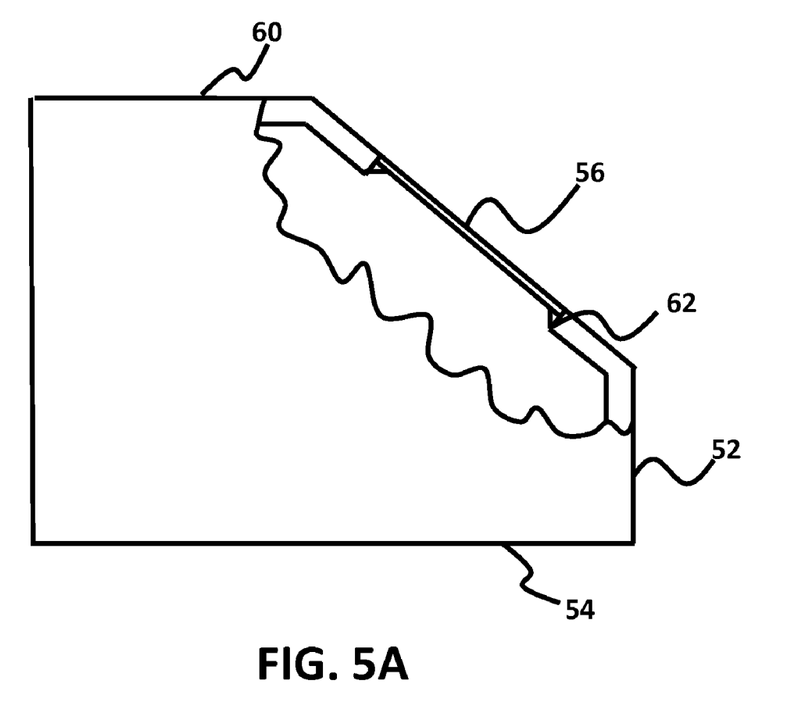
FIG. 5a is a side view and FIG. 5b is a front view of a pet solar heater.
Figure 5B:
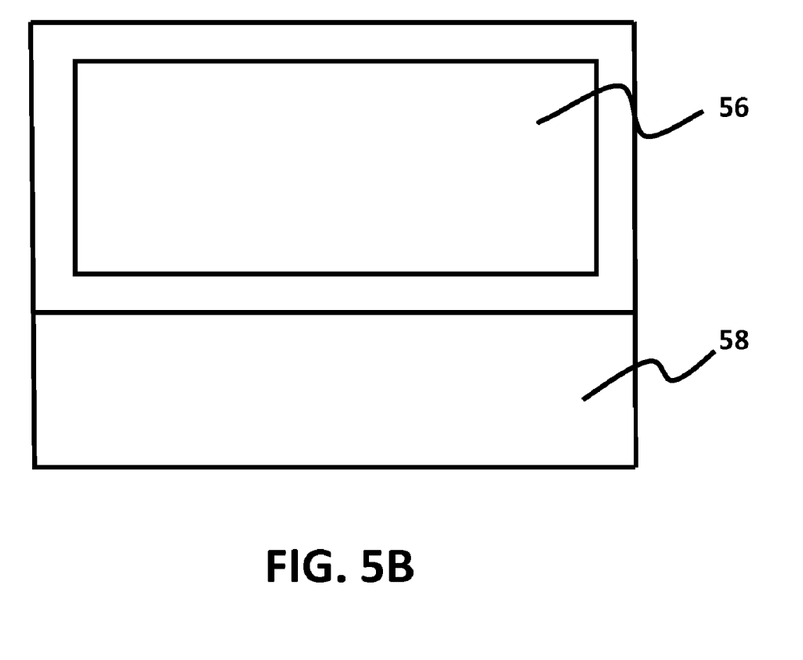

A passive solar pet house in accordance with the present invention is illustrated in FIG. 5A, which provides a partially cut-away side view of the pet house 50, and FIG. 5B, which provides a front view. In the preferred embodiment of the present invention, when the pet house 50 is positioned in its summer operating position, the dimensions of the shell 52 and window 56 are as follows:

The bottom side panel 54 is 3 feet 6 inches square;
The height of the pet house 50 is 3 feet;
The height of the front face panel 58 is 1 foot;
The depth of the top panel 60 is 1 foot 6 inches; and
The window 56 is 1 feet 6 inches high by 3 feet wide.

After accounting for a portion of the internal volume created by the shell 52 being filled with insulation, the above dimensions yield an interior volume of the pet house 50 of +/−27 cubic feet, while the size of the glass window 56 is +/−4.5 square feet, thereby creating a preferable 6:1 ratio. Ratios of between 4.5:1 and 6.75:1 would also be acceptable.

As with the portable heater 10, the window 56 shape and the internal volume to window size ratio is selected to generate an appropriate amount of heat within the pet house 50. Unlike the heater 10, which is intended to heat food to a safe consumption temperature, the pet house 50 is only intended to provide a comfortable temperature range for a dog or cat when outside temperatures are lower, such as in the spring, winter and fall. During the summer months in parts of the world, it might be necessary to cover the window to prevent the pet house 50 from overheating. A retractable cover could be incorporated into the pet house 50, or applied over the window 56, to facilitate covering the window 56 when additional heating was not desired.

Also, as with the heater 10, the exterior would be darkly colored and made of plastic or some other durable material, while the interior surface would be white or some other highly reflective surface. An insulated door, similar to door 20, could be provided to the back of the unit to facilitate removal of a pet from the pet house 50 and to facilitate cleaning the pet house 50. The angle of the window 56 would be +/−25 degrees in the summer and, by rotating the pet house 50 by 90 degrees to its back, the angle of the window 56 would be +/−65 degrees in the winter. As illustrated in the partially cut-away portion of FIG. 5A, the window 56 is set within a frame 62 formed within the shell 52.

A pet door would preferably be installed into either side of the pet house 50 to enable access, with the use, type and insulated nature of the pet door depending on the type of pet and the location of the pet house 50. Additional ventilation may also be required. To facilitate rotation of the pet house 50 from its summer operating position to its winter operating position, the pet door would also need to be repositioned or accessible by the pet regardless of its position. For example, a flap style door might need to be repositioned, where a different type of door opening may not. Since the size and R-value of the pet door can have a significant impact on the efficiency of the pet house 50, the pet door should be carefully selected. Preferably, the overall R-value of the pet house 50 (other than the window 56) is 5 or higher.

Figure 6A:
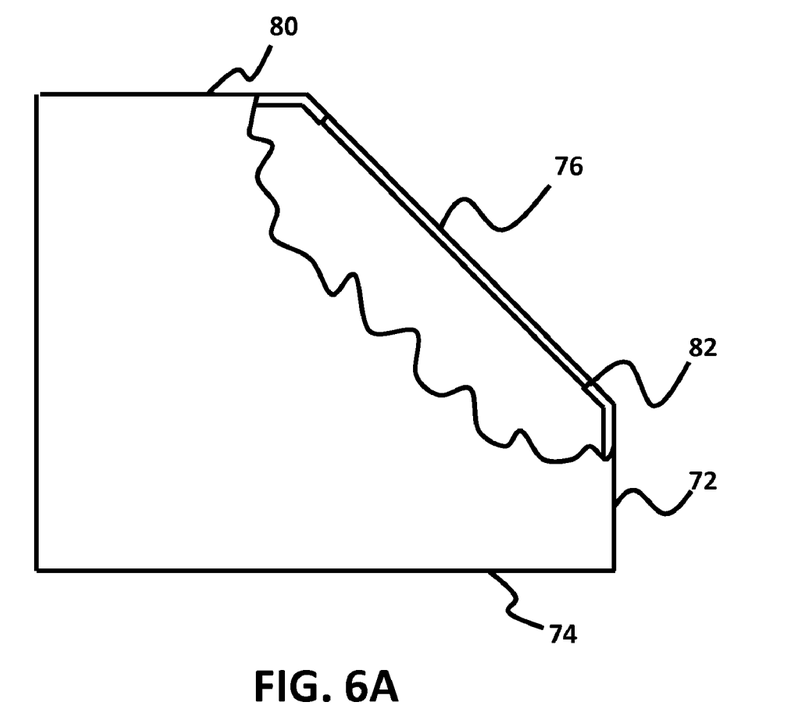
FIG. 6a is a side view and FIG. 6b is a front view of a tent solar heater.
Figure 6B:
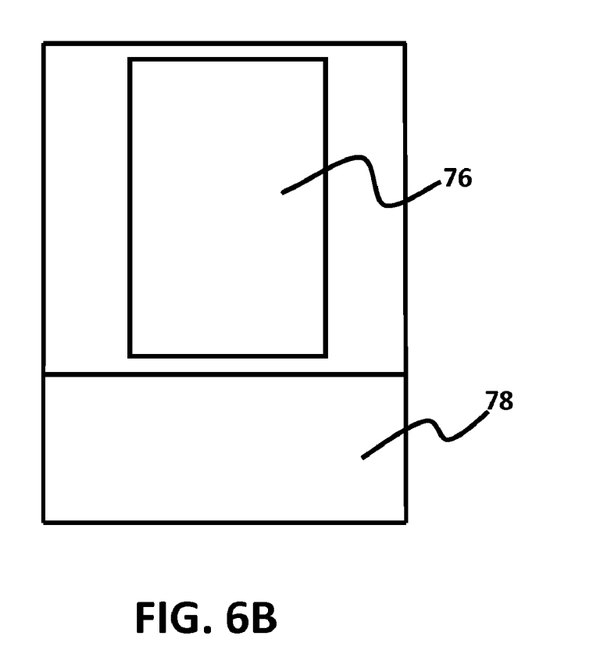

A passive solar tent in accordance with the present invention is illustrated in FIG. 6A, which provides a partially cut-away side view of the tent 70, and FIG. 6B, which provides a front view. In the preferred embodiment of the present invention, when the tent 70 is positioned in its summer operating position, the dimensions of the shell 72 and window 76 are as follows:

The bottom side panel 74 is 7 feet deep by 4 feet wide;
The height of the tent 70 is 6 feet;
The height of the front face panel 78 is 2 feet;
The depth of the top panel 80 is 3 feet; and
The window 76 is 5 feet high by 2 feet 3 inches wide.

After accounting for a portion of the internal volume created by the shell 72 being filled with insulation, the above dimensions yield an interior volume of the tent 70 of +/−144 cubic feet, while the size of the glass window 76 is +/−12 square feet, thereby creating a 12:1 ratio. Ratios of as low as 6:1 would also be acceptable. As with the heater 10 and pet house 50, the insulation of the tent 70, aside from the window and any ventilation should result in an R-value of 5 or more, with the exterior being black and the interior being white or highly reflective. In each case, the dimensions and R-values need to be balanced to the particular application. The primary utilization of the tent 70 would be to generate a moderate level of heat within the tent 70 so as to keep its occupants comfortable, without overheating. Higher volume to window size ratios may be needed and appropriate if the tent 70 is primarily to be used later in the day and over night, where heat needs to be built up quickly and then retained for as long as possible. Variable window 76 shape designs can be used to model the most appropriate heat generation capabilities for particular intended uses, and as noted above, if necessary, the tent 70 can be turned on its side to further maximize heat generation and retention. Ventilation will also be necessary and R-values will need to be adjusted in order accommodate heat loss due to ventilation.

Since the human occupants of the tent 70 can manipulate a full size door in the back of the tent 70, there is no need to provide a per door like opening, but it will be necessary to create a internal latching mechanism for the door that can be opened from the inside and the outside. Also, since it may be desirable to make the tent 70 portable, very different light weight and flexible insulation materials may be required for the tent 70 than were appropriate for use with the heater 10 and pet house 50. For example, it may be necessary to make the tent 70 so that it can be assembled and disassembled quickly by one or more users. Alternatively, the tent 70 could be stationary, and much larger, such as the tents used for picnics, sporting events and other outdoor events, especially in cold weather climates. Finally, as with the heater 10 and the pet house 50, the tent 70 has both a summer and winter operation position, whether the window 76 is at 25 degrees relative to ground in the summer and when rotated 90 degrees, the window 76 is at 65 degrees to ground in the winter.

Many more applications are possible provided certain aspects of the invention are maintained, including the dark exterior and highly reflective interior, the overall R-value of the insulated walls of the heating unit (heater 10, pet house 50, tent 70, etc.) are 5 or higher, the window has an R-value of 1 or more, the door or other opening is capable of retaining as much heat as possible, and the entire heating unit can be rotated from the summer window angle of approximately 25 degrees to ground to a winter angle of approximately 55 degrees to ground without requires structural modification of the heating unit.

While the present invention has been illustrated and described in terms of a preferred embodiment and several alternatives herein in association with the various drawing figures, should not be limited to just the particular description contained in this specification. Additional alternative or equivalent components and steps could be used to practice the present invention.

What is claimed is:

1. A portable, self-contained, passive solar system, comprising an insulated shell including a top panel, a bottom panel, a front panel, a first side panel, a second side panel, a third side panel, and an inclined panel having a window with a window area when the insulated shell is positioned in a first operating position, and the top panel becoming a first side of the insulated shell, the front panel becoming a top of the insulated shell, the bottom panel becoming a second side of the insulated shell, and the third side panel becoming a bottom of the insulated shell when the insulated shell is positioned in a second operating position, the insulated shell including an exterior surface and an interior surface, the top panel, the bottom panel, the front panel, the first side panel, the second side panel, the third side panel, and the inclined panel forming an interior having a volume for holding an item, the window permitting sun light to enter the insulated shell and heat the item while the interior surface and the top panel in the first operating position and the front panel in the second operating position cause the sun light to be reflected and trapped within the interior, wherein a ratio between an area of the front panel and an area of the inclined panel is between 1:1.2 and 1:2.8, and wherein a ratio between the volume to the window area is between approximately 4.5:1 and approximately 20:1.

2. The system of claim 1, wherein the inclined panel is positioned at a 25 degree angle relative to the bottom panel when the insulated shell is positioned in the first operating position, and wherein the inclined panel is positioned at a 65 degree angle relative to the bottom of the insulated shell when the insulated shell is positioned in the second operating position.

3. The system of claim 1, wherein the first operating position is a summer operating position and the second operating position is a winter operating position.

4. The system of claim 1, wherein the exterior surface is darkly colored to absorb heat from the sun and wherein the interior surface is lightly colored to reflect sun light entering the insulated shell.

5. The system as recited in claim 1, wherein the window has an R-value of at least 1 and each of the top panel, the bottom panel, the front panel, the first side panel, the second side panel, and the third side panel have an R-value of at least 5.

6. The system as recited in claim 1, wherein the item is a personal item of a user and wherein a ratio between the volume to the area is between approximately 5:1 and approximately 20:1.

7. The system as recited in claim 6, wherein the ratio is approximately 16:1.

8. The system as recited in claim 1, wherein the item is a pet of a user and wherein a ratio between the volume to the area is between approximately 4.5:1 and approximately 6.75:1.

9. The system as recited in claim 8, wherein the ratio is approximately 6:1.

10. The system as recited in claim 8, further comprising a ventilator and a cover for the window.

11. The system as recited in claim 8, wherein either the first side panel, the second side panel, or the third side panel has a door flap for the pet to ingress and egress.

12. The system as recited in claim 1, wherein the system is used for heating a user and wherein a ratio between the volume to the area is between approximately 6:1 and approximately 12:1.

13. The system as recited in claim 12, wherein the ratio is approximately 12:1.

14. The system as recited in claim 12, further comprising a ventilator and a cover for the window.

15. The system as recited in claim 12, wherein either the first side panel, the second side panel, or the third side panel has a door with an internal closing mechanism for the user to ingress and egress.

16. The system as recited in claim 1, wherein the third side panel is a door having a latch for holding the door closed.

17. The system as recited in claim 16, wherein the latch is a compression latch.

18. The system as recited in claim 1, further comprising a handle attached to the first side panel and the second side panel for enabling a user to portably carry the insulated shell with the item sitting balanced on the interior surface of the bottom panel.

19. The system as recited in claim 1, wherein the inclined panel is positioned at a 5 degree angle relative to the bottom panel when the insulated shell is positioned in the first operating position, and wherein the inclined panel is positioned at an 85 degree angle relative to the bottom of the insulated shell when the insulated shell is positioned in the second operating position.

20. A portable, self-contained, passive solar system, comprising an insulated shell including a top panel, a bottom panel, a front panel, a first side panel, a second side panel, a third side panel, and an inclined panel having a window with a window area when the insulated shell is positioned in a first operating position, and the top panel becoming a first side of the insulated shell, the front panel becoming a top of the insulated shell, the bottom panel becoming a second side of the insulated shell, and the third side panel becoming a bottom of the insulated shell when the insulated shell is positioned in a second operating position, the insulated shell including an exterior surface and an interior surface, the top panel, the bottom panel, the front panel, the first side panel, the second side panel, the third side panel, and the inclined panel forming an interior having a volume for holding an item, the inclined panel positioned at a 25 degree angle relative to the bottom panel when the insulated shell is positioned in the first operating position, the inclined panel positioned at a 65 degree angle relative to the bottom of the insulated shell when the insulated shell is positioned in the second operating position, the window having an R-value of at least 1 and each of the top panel, the bottom panel, the front panel, the first side panel, the second side panel, and the third side panel having an R-value of at least 5, the window permitting sun light to enter the insulated shell and heat the item while the interior surface and the top panel in the first operating position and the front panel in the second operating position cause the sun light to be reflected and trapped within the interior, wherein a ratio between an area of the front panel and an area of the inclined panel is between 1:1.2 and 1:2.8, and wherein a ratio between the volume to the window area is between approximately 4.5:1 and approximately 20:1.

21. The system of claim 20, wherein the exterior surface is darkly colored to absorb heat from the sun and wherein the interior surface is lightly colored to reflect sun light entering the insulated shell.

22. The system as recited in claim 20, wherein the item is a personal item of a user and wherein a ratio between the volume to the area is between approximately 5:1 and approximately 20:1.

23. The system as recited in claim 20, wherein the item is a pet of a user and wherein a ratio between the volume to the area is between approximately 4.5:1 and approximately 6.75:1.

24. The system as recited in claim 23, further comprising a ventilator and a cover for the window, and wherein either the first side panel, the second side panel, or the third side panel has a door flap for the pet to ingress and egress.

25. The system as recited in claim 20, wherein the system is used for heating a user and wherein a ratio between the volume to the area is between approximately 6:1 and approximately 12:1.

26. The system as recited in claim 25, further comprising a ventilator and a cover for the window, and wherein either the first side panel, the second side panel, or the third side panel has a door with an internal closing mechanism for the user to ingress and egress.

27. The system as recited in claim 1, wherein a ratio between an area of the top panel and the area of the inclined panel is between approximately 1:1.4 and approximately 1:1.9.

28. The system as recited in claim 1, wherein a ratio between an area of the top panel and the window area is between approximately 1:0.57 and approximately 1:0.94.

29. The system as recited in claim 1, wherein a ratio between the area of the front panel and the window area is between approximately 1:0.49 and approximately 1:1.4.

30. A portable, self-contained, passive solar system, comprising an insulated shell including a top panel, a bottom panel, a front panel, a first side panel, a second side panel, a third side panel, and an inclined panel having a window with a window area when the insulated shell is positioned in a first operating position, and the top panel becoming a first side of the insulated shell, the front panel becoming a top of the insulated shell, the bottom panel becoming a second side of the insulated shell, and the third side panel becoming a bottom of the insulated shell when the insulated shell is positioned in a second operating position, the insulated shell including an exterior surface and an interior surface, the top panel, the bottom panel, the front panel, the first side panel, the second side panel, the third side panel, and the inclined panel forming an interior having a volume for holding an item, the window permitting sun light to enter the insulated shell and heat the item while the interior surface and the top panel in the first operating position and the front panel in the second operating position cause the sun light to be reflected and trapped within the interior, wherein a ratio between an area of the top panel and an area of the inclined panel is between 1:1.4 and 1:1.9, and wherein a ratio between the volume to the window area is between approximately 4.5:1 and approximately 20:1.

* * * * *